United States Patent
Tsuji

(10) Patent No.: US 10,911,401 B2
(45) Date of Patent: Feb. 2, 2021

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Ryoya Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 69 days.

(21) Appl. No.: 16/423,409

(22) Filed: May 28, 2019

(65) Prior Publication Data
US 2019/0364015 A1 Nov. 28, 2019

(30) Foreign Application Priority Data

May 28, 2018 (JP) .................................. 2018-101637

(51) Int. Cl.
*H04L 29/12* (2006.01)

(52) U.S. Cl.
CPC ...... *H04L 61/2514* (2013.01); *H04L 61/2007* (2013.01); *H04L 61/2046* (2013.01)

(58) Field of Classification Search
CPC ............. H04L 61/2514; H04L 61/2007; H04L 61/2046
See application file for complete search history.

(56) References Cited

U.S. PATENT DOCUMENTS

| 2005/0114625 | A1* | 5/2005 | Snyder | .................... | H04L 41/08 712/1 |
| 2005/0251684 | A1* | 11/2005 | Mitsuoka | ............ | H04L 67/1097 713/182 |
| 2010/0107223 | A1* | 4/2010 | Zheng | .................... | H04L 63/10 726/3 |
| 2010/0235883 | A1* | 9/2010 | Sato | .................... | H04N 1/4433 726/3 |
| 2011/0110568 | A1* | 5/2011 | Vesper | .................... | H04L 63/08 382/128 |

(Continued)

FOREIGN PATENT DOCUMENTS

JP 2016-212832 A 12/2016

OTHER PUBLICATIONS

Draft Device Provisioning Protocol Technical Specification Version 0.2.11, draft of a standard prepared by the Wi-Fi Alliance, cited in spec on p. 14.

*Primary Examiner* — Ajay Cattungal
(74) *Attorney, Agent, or Firm* — Scully, Scott, Murphy & Presser, PC

(57) ABSTRACT

A communication device may receive a target IP address from a target device by using a first communication scheme; after the target IP address which is a global IP address has been received from the target device, send a first signal including the target IP address as a destination IP address via the Internet by using a second communication scheme; determine whether a second signal is received via the Internet by using the second communication scheme in response to sending the first signal, the second signal including the target IP address as a source IP address; and in a case where it is determined that the second signal is received, execute a security process related to security of the target device.

21 Claims, 6 Drawing Sheets

(56) References Cited

U.S. PATENT DOCUMENTS

| | | | |
|---|---|---|---|
| 2011/0153351 A1* | 6/2011 | Vesper | G16H 15/00 |
| | | | 705/2 |
| 2016/0105407 A1* | 4/2016 | Ohbitsu | H04L 63/0876 |
| | | | 713/171 |
| 2016/0277413 A1* | 9/2016 | Ajitomi | H04L 63/105 |
| 2016/0337393 A1* | 11/2016 | Tsuchitoi | H04L 63/1441 |
| 2019/0373128 A1* | 12/2019 | Kozuka | H04N 1/00233 |

* cited by examiner

COMMUNICATION DEVICE AND NON-TRANSITORY COMPUTER-READABLE MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2018-101637 filed on May 28, 2018, the contents of which are hereby incorporated by reference into the present application.

TECHNICAL FIELD

The disclosure herein discloses a technique relating to a communication device capable of executing a process related to security of a target device.

DESCRIPTION OF RELATED ART

An information processing system comprising an MFP and a server is known. The server manages a global IP address that the MFP used to connect to a global network (called an MFP public address below). The MFP determines whether an IP address of the MFP is a private IP address or not. In case of determining that the IP address is not a private IP address, the MFP sends request data to the server and receives response data including the MFP public address from the server. In a case where the IP address of the MFP matches the MFP public address in the response data, the MFP displays an alert indicating that there is a possibility of the MFP being accessed in an unauthorized manner from a device on the Internet since the MFP is open to the Internet.

SUMMARY

In the aforementioned technique, a mechanism for determining whether there is the possibility of the MFP being accessed in an unauthorized manner via the Internet has to be provided in the MFP.

The disclosure herein provides a technique that does not require a target device to be provided with a mechanism for determining whether there is a possibility of the target device being accessed in an unauthorized manner via the Internet.

A non-transitory computer-readable medium storing computer-readable instructions for a communication device is disclosed herein. The computer-readable instructions, when executed by a processor of the communication device, may cause the communication device to: receive a target IP address from a target device by using a first communication scheme, the target IP address being an IP address of the target device, and the target device being different from the communication device; after the target IP address which is a global IP address has been received from the target device, send a first signal including the target IP address as a destination IP address via the Internet by using a second communication scheme different from the first communication scheme; determine whether a second signal is received via the Internet by using the second communication scheme in response to sending the first signal, the second signal including the target IP address as a source IP address; and in a case where it is determined that the second signal is received, execute a security process related to security of the target device, wherein in a case where it is determined that the second signal is not received, the security process is not executed.

The above communication device itself and a method carried out by the communication device are also novel and useful. Moreover, a communication system comprising the above communication device and another device (e.g., the target device) is also novel and useful.

EMBODIMENTS

Figure 1:
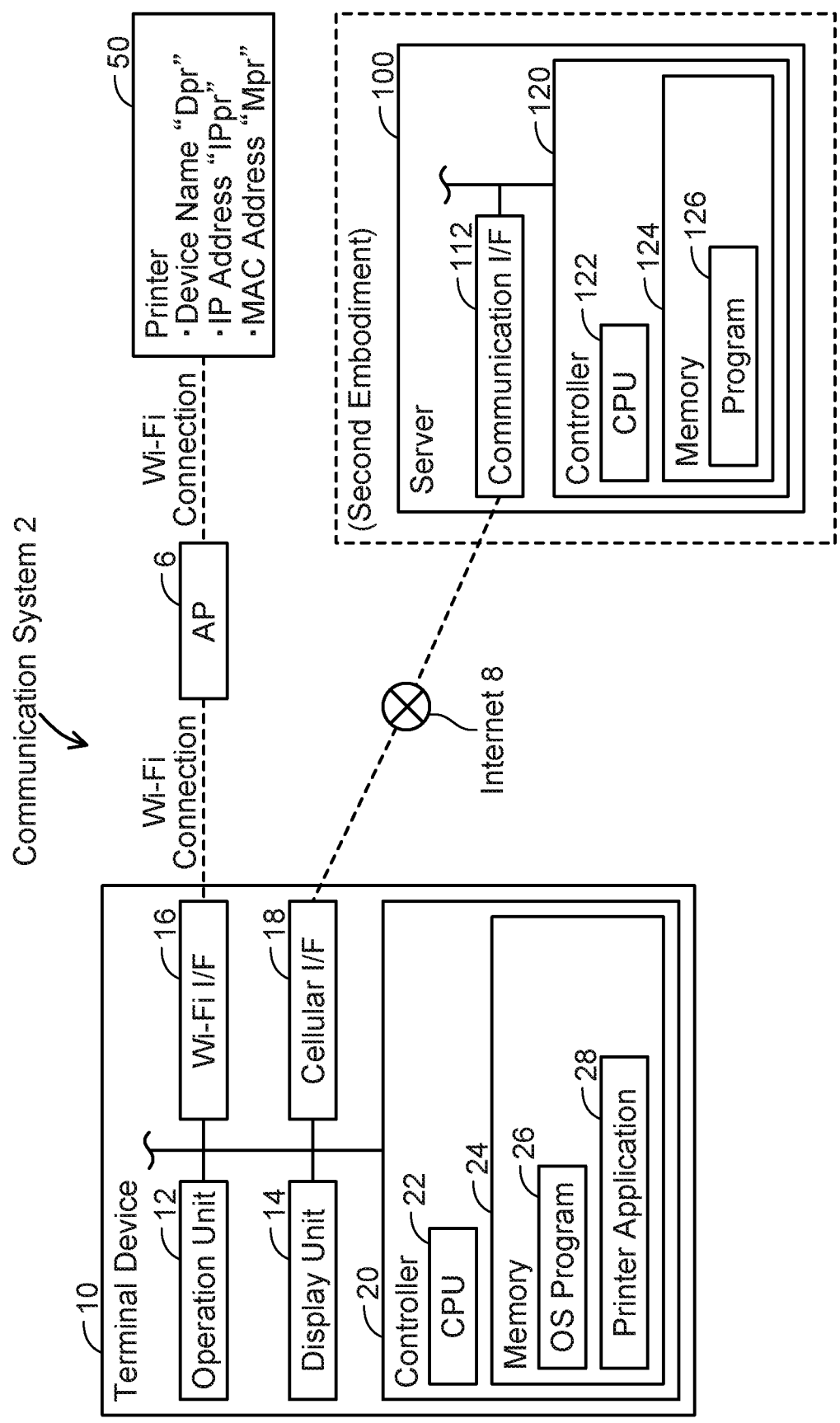
FIG. 1 shows a configuration of a communication system.

First Embodiment (Configuration of Communication System 2; FIG. 1) As shown in FIG. 1, a communication system 2 comprises a terminal device 10 and a printer 50. Each of the terminal device 10 and the printer 50 is establishing a connection according to a Wi-Fi scheme (called "Wi-Fi connection" below) with a same AP 6, and they are capable of communicating with each other via the AP 6.

(Configuration of Terminal Device 10)

The terminal device 10 may be a stationary device or a portable device. The portable device includes, for example, a mobile phone, a smartphone, a PDA, a notebook PC, a tablet PC, etc. The terminal device 10 comprises an operation unit 12, a display unit 14, a Wi-Fi interface (below, interface will be denoted "I/F") 16, a cellular I/F 18, and a controller 20.

The operation unit 12 comprises a plurality of keys. A user can input various instructions to the terminal device 10 by operating the operation unit 12. The display unit 14 is a display for displaying various types of information. The display unit 14 functions as a so-called touch panel. That is, the display unit 14 also functions as an operation unit.

The Wi-Fi I/F 16 is an I/F for executing wireless communication according to the Wi-Fi scheme (called "Wi-Fi communication" below). The Wi-Fi scheme is a scheme based on, for example, standard 802.11 of IEEE (abbreviation of The Institute of Electrical and Electronics Engineers, Inc.) and includes, for example, 802.11a, 11b, 11g, 11n, 11ac, etc.

The cellular I/F 18 is configured separately from the Wi-Fi I/F 16, and is an I/F for executing wireless communication according to a cellular scheme (called "cellular communication" below). The cellular scheme is a scheme that uses connections with base stations provided respectively in sections (i.e., cells) within an area where the terminal device 10 is used (called "cellular connection" below), and includes, for example, 3G, 4G, LTE (abbreviation of Long Term Evolution), 5G, etc. A frequency used in the cellular scheme (approximately 0.7 GHz to approximately 2 GHz, approximately 3.5 GHz) is different from a frequency used in the Wi-Fi scheme (i.e., 2.4 GHz or 5.0

GHz). In a situation where a cellular connection is established, the terminal device 10 can execute communication via the Internet 8.

As described above, the terminal device 10 is capable of executing both Wi-Fi communication and cellular communication. However, the terminal device 10 cannot establish both a Wi-Fi connection and a cellular connection simultaneously. That is, when cellular communication is to be executed in a state where a Wi-Fi connection is established, the terminal device 10 establishes a cellular connection after disconnecting the Wi-Fi connection. Moreover, when Wi-Fi communication is to be executed in a state where a cellular connection is established, the terminal device 10 establishes a Wi-Fi connection after disconnecting the cellular connection.

The controller 20 comprises a CPU 22 and a memory 24. The memory 24 is constituted of a volatile memory, a non-volatile memory, and the like. The CPU 22 is configured to execute various processes in accordance with programs 26, 28 stored in the memory 24. The OS (abbreviation of Operating System) program 26 is a program for controlling various basic operations of the terminal device 10. The printer application (simplified as "app" below) 28 is an application provided by a vendor of the printer 50 and is installed in the terminal device 10 from, for example, a server on the Internet. The app 28 is an application for registering information of the printer 50 and causing the printer 50 to execute printing. Moreover, in the present embodiment, the app 28 is configured to execute a process related to security of the printer 50.

(Configuration of Printer 50)

The printer 50 is a peripheral device (e.g., a peripheral device of the terminal device 10) capable of executing a print function. A device name "Dpr", which is information for identifying the printer 50, is assigned to the printer 50. Moreover, the printer 50 has an IP address "IPpr" and a MAC address "Mpr".

A private IP address or a global IP address is assigned as the IP address "IPpr". A global IP address is necessary for communication via the Internet 8. Thus, in a case where the IP address "IPpr" is a private IP address, the printer 50 is not accessed in an unauthorized manner via the Internet 8. On the other hand, in a case where the IP address "IPpr" is a global IP address, a signal including the IP address "IPpr" as its destination IP address may be sent from a device on the Internet 8. In this case, if a firewall function of the AP 6 is enabled, the signal is not received by the printer 50, and consequently an unauthorized access to the printer 50 does not occur. However, if the firewall function of the AP 6 is not enabled, the signal may be received by the printer 50. That is, an unauthorized access to the printer 50 may occur. In the present embodiment, the app 28 of the terminal device 10 determines whether there is a possibility of an unauthorized access to the printer 50, which suppresses the unauthorized access.

Figure 2:
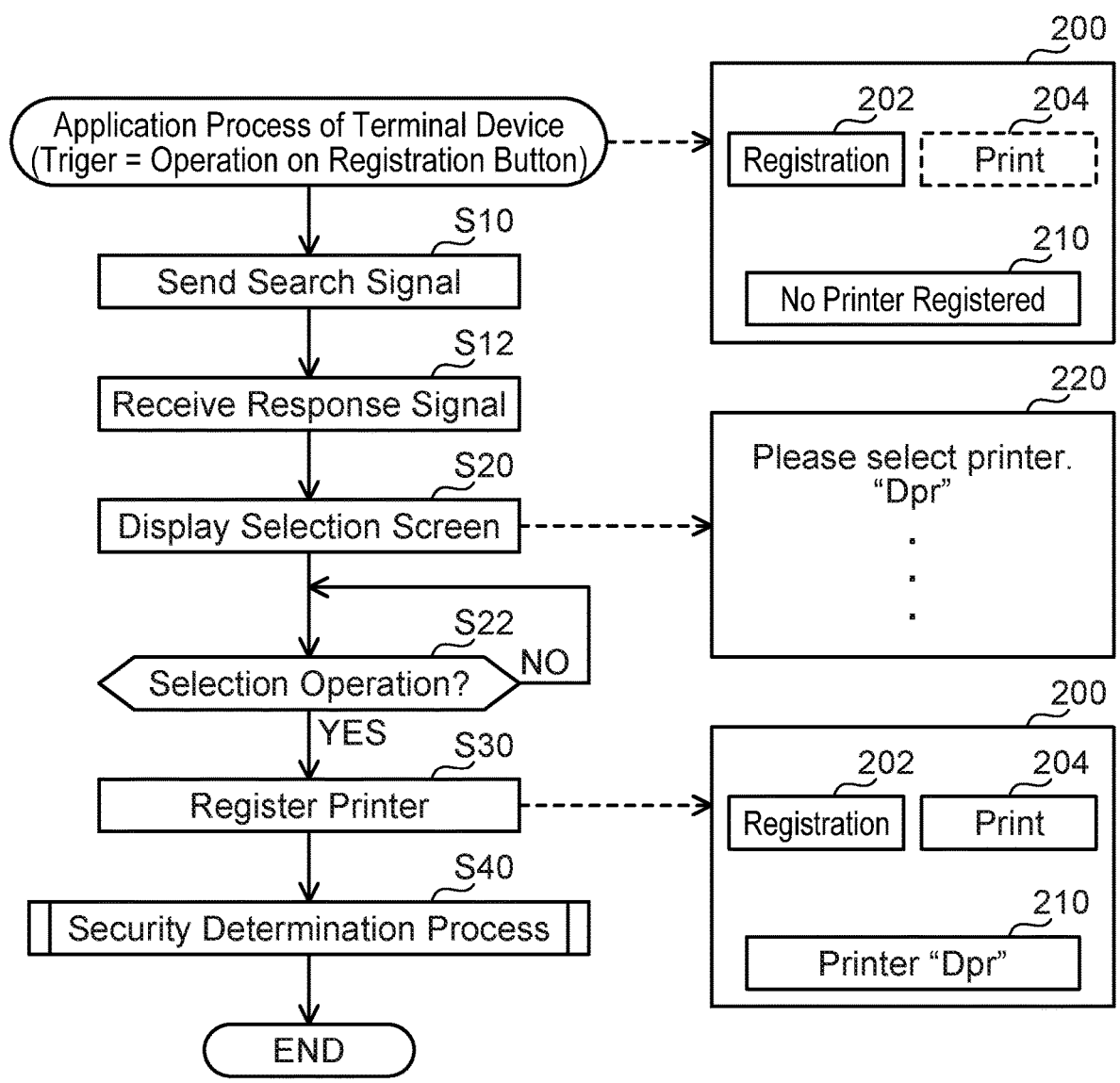
FIG. 2 shows a flowchart of an application process.

(Application Process: FIG. 2)

Next, a process executed by the CPU 22 of the terminal device 10 in accordance with the app 28 will be described with reference to FIG. 2. The process of FIG. 2 is started in a situation where a Wi-Fi connection is established between the terminal device 10 and the AP 6.

In a case where an operation for activating the app 28 is performed by the user, the CPU 22 displays a home screen 200 on the display unit 14. The home screen 200 includes a registration button 202 for registering printer information in the memory 24 (i.e., in the app 28), a print button 204 for causing a registered printer to execute printing, and a display area 210 for displaying a device name of a registered printer. Here, a situation is assumed in which printer information has not been registered yet, thus the print button 204 is displayed in an unselectable state and the display area 210 does not display any printer information therein. When an operation of selecting the registration button 202 is accepted, the CPU 22 starts the process of FIG. 2.

In S10, the CPU 22 broadcasts a search signal, which is for searching for a printer, to the AP 6 by using the Wi-Fi I/F 16 without intermediation of the Internet 8. Thereby, the search signal is received by each of one or more printers connected to the AP 6.

In S12, the CPU 22 receives response signals respectively from the one or more printers by using the Wi-Fi I/F 16 without intermediation of the Internet 8. Each of the response signals includes a device name, an IP address, and a MAC address of the source printer.

In S20, the CPU 22 displays, on the display unit 14, a selection screen 220 that includes the one or more device names included in the one or more response signals received in S12.

In S22, the CPU 22 monitors whether an operation of selecting a device name in the selection screen 220 is accepted. In a case where the operation of selecting a device name is accepted, the CPU 22 determines YES in S22 and proceeds to S30. Below, a situation in which the device name "Dpr" of the printer 50 is selected will be described as an example.

In S30, the CPU registers in the memory 24 (i.e., in the app 28) information of the printer 50 selected in S22. The information of the printer 50 includes the device name "Dpr" selected in S22, the IP address "IPpr" included in the response signal received from the printer 50 in S12, and the MAC address "Mpr" included in the response signal.

Upon executing S30, the CPU 22 displays, on the display unit 14, the home screen 200 that includes the print button 204 in a selectable state and the display area 210 including the device name "Dpr" of the printer 50. Thereby, in a case where an operation of selecting the print button 204 is accepted, the CPU 22 can send print data representing an image to be printed to the printer 50 by using the Wi-Fi I/F 16, with the registered IP address "IPpr" as its destination. As a result, the printer 50 can be caused to execute printing of the image.

Figure 3:
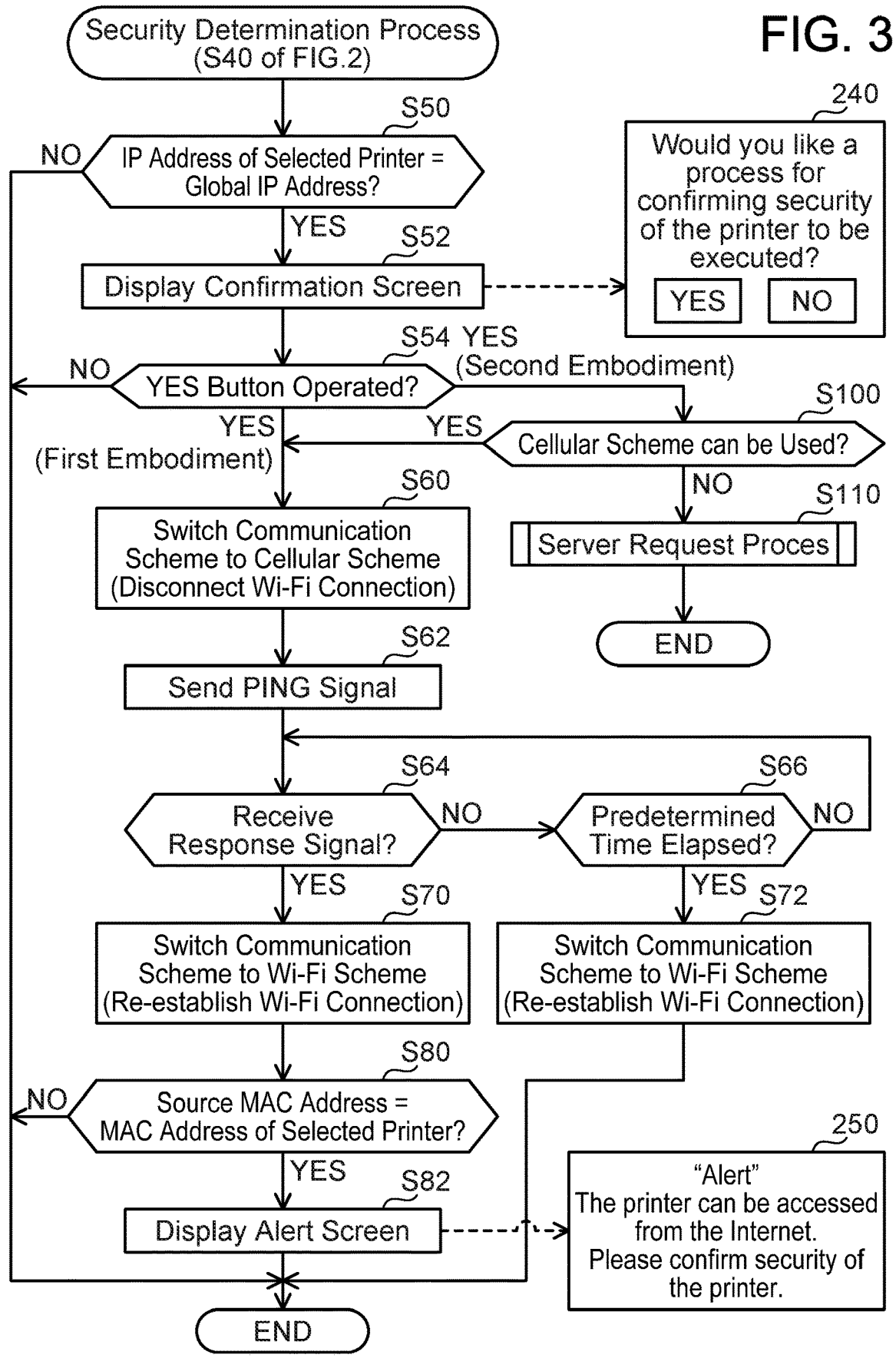
FIG. 3 shows a flowchart of a security determination process.

In S40, the CPU 22 executes a security determination process (see FIG. 3). This is a process for determining whether there is a possibility of the printer 50 being accessed in an unauthorized manner via the Internet 8. The user is highly likely to perform an operation for registering the information of the printer 50 in the terminal device 10 (i.e., operation on the registration button 202, etc) immediately after the printer 50 is purchased and connected to the AP 6. Therefore, if the security determination process is executed when the information of the printer 50 is registered in the terminal device 10, the security determination process can be executed immediately after the printer 50 is connected to the AP 6. Thereby, a state in which an unauthorized access to the printer 50 may occur can be suppressed from continuing for a long time. When S40 completes, the process of FIG. 2 ends.

(Security Determination Process; FIG. 3)

Next, contents of the security determination process of S40 in FIG. 2 will be described with reference to FIG. 3. In S50, the CPU 22 determines whether the IP address "IPpr" of the printer 50 (i.e., the IP address registered in S30 of FIG. 2) is a global IP address (which may be called "GIP" below). GIPs are classified into class A to class C by JPNIC (Japan Network Information Center), which is an organization that manages GIPs. Ranges of GIPs in class A are "1.0.0.0 to 9.255.255.255" and "11.0.0.0 to 126.255.255.255", ranges of GIPs in class B are "128.0.0.0 to 172.15.255.255" and "172.32.0.0 to 191.255.255.255", and ranges of GIPs in class C are "192.0.0.0 to 192.167.255.255" and "192.169.0.0 to 223.255.255.255". In a case where the IP address "IPpr" is an address in the aforementioned ranges of GIPs, the CPU 22 determines that the IP address "IPpr" is a GIP (YES in S50) and proceeds to S52. On the other hand, in a case where the IP address "IPpr" is not an address in the aforementioned ranges of GIPs, the CPU 22 determines that the IP address "IPpr" is not a GIP (i.e., determines that the IP address "IPpr" is a private IP address) (NO in S50), skips processes from S52 onward, and ends the process of FIG. 3. Since an unauthorized access to the printer 50 cannot occur in the case where the IP address "IPpr" is a private IP address, the processes from S52 onward are not executed. Thereby, processing load can be reduced.

In S52, the CPU 22 displays a confirmation screen 240 on the display unit 14. The confirmation screen 240 is a screen for asking the user whether to execute a process of confirming security of the printer 50. In the subsequent processes, cellular communication, for which the user is charged, is usually executed, thus the user is asked in S52 whether or not the subsequent processes are to be executed.

In S54, the CPU 22 determines whether an operation of selecting a YES button in the confirmation screen 240 is performed. The CPU 22 determines YES in S54 and proceeds to S60 in a case where the operation of selecting the YES button is performed in the confirmation screen 240. On the other hand, the CPU 22 determines NO in S54, skips the subsequent processes, and ends the process of FIG. 3 in a case where an operation of selecting a NO button is performed in the confirmation screen 240.

In S60, the CPU 22 switches the communication scheme to be used by the terminal device 10 from the Wi-Fi scheme to the cellular scheme. Specifically, the CPU 22 disconnects the Wi-Fi connection, and then establishes a cellular connection with a base station by using the cellular I/F 18. Thereby, the terminal device 10 comes to be capable of executing communication via the Internet 8 by using the cellular connection.

In S62, the CPU 22 sends a PING signal including the IP address "IPpr" of the printer 50 as its destination IP address via the Internet 8 by using the cellular I/F 18.

Next, the CPU 22 repeats a determination whether a response signal to the PING signal is received in S64 and a determination whether a predetermined time has elapsed since the sending of the PING signal in S66. Thereby, the CPU 22 determines whether a response signal including the IP address "IPpr" as its source IP address has been received via the Internet 8 by using the cellular I/F 18 within the predetermined time from the sending of the PING signal. Here, a reception of the response signal means that there is the possibility of an unauthorized access to the printer 50. The CPU 22 proceeds to S70 in a case of determining that the response signal has been received (YES in S64), whereas the CPU 22 proceeds to S72 in a case of determining that the response signal has not been received (YES in S66).

In S70, the CPU 22 switches the communication scheme to be used by the terminal device 10 from the cellular scheme to the Wi-Fi scheme. Specifically, the CPU 22 disconnects the cellular connection, and then re-establishes a Wi-Fi connection by using the Wi-Fi I/F 16. Thereby, the terminal device 10 returns to be capable of executing communication via the AP 6 by using the Wi-Fi connection.

When S70 completes, the CPU 22 proceeds to S80. Moreover, S72 is the same as S70. When S72 completes, the CPU 22 skips S80 and S82, by which the process of FIG. 3 ends.

In S80, the CPU 22 determines whether a source MAC address included in the response signal matches the MAC address "Mpr" of the printer 50 (i.e., the MAC address registered in S30 of FIG. 2). For example, there may be a case where a same global IP address is assigned to both the printer 50 and another device. In this case, a source device of the response signal received in S64 may be the other device that is different from the printer 50. In order to determine whether the source device of the response signal is the printer 50, whether the source MAC address matches the MAC address "Mpr" is determined in S80. Thereby, in a case where the source device of the response signal is the other device, that is, in a case where there is no possibility of an unauthorized access to the printer 50, an alert screen (to be described later, see S82) does not have to be displayed. In a case of determining that the source MAC address and the MAC address "Mpr" match (YES in S80), that is, in a case of determining that the source device of the response signal is the printer 50, the CPU 22 proceeds to S82. On the other hand, in a case of determining that the source MAC address and the MAC address "Mpr" do not match (NO in S80), that is, in a case of determining that the source device of the response signal is not the printer 50, the CPU 22 skips S82 and ends the process of FIG. 3.

In S82, the CPU 22 displays an alert screen 250 on the display unit 14. The alert screen 250 includes a message indicating that the printer 50 can be accessed from the Internet 8 and a message indicating that the security of the printer 50 should be confirmed.

Figure 4:
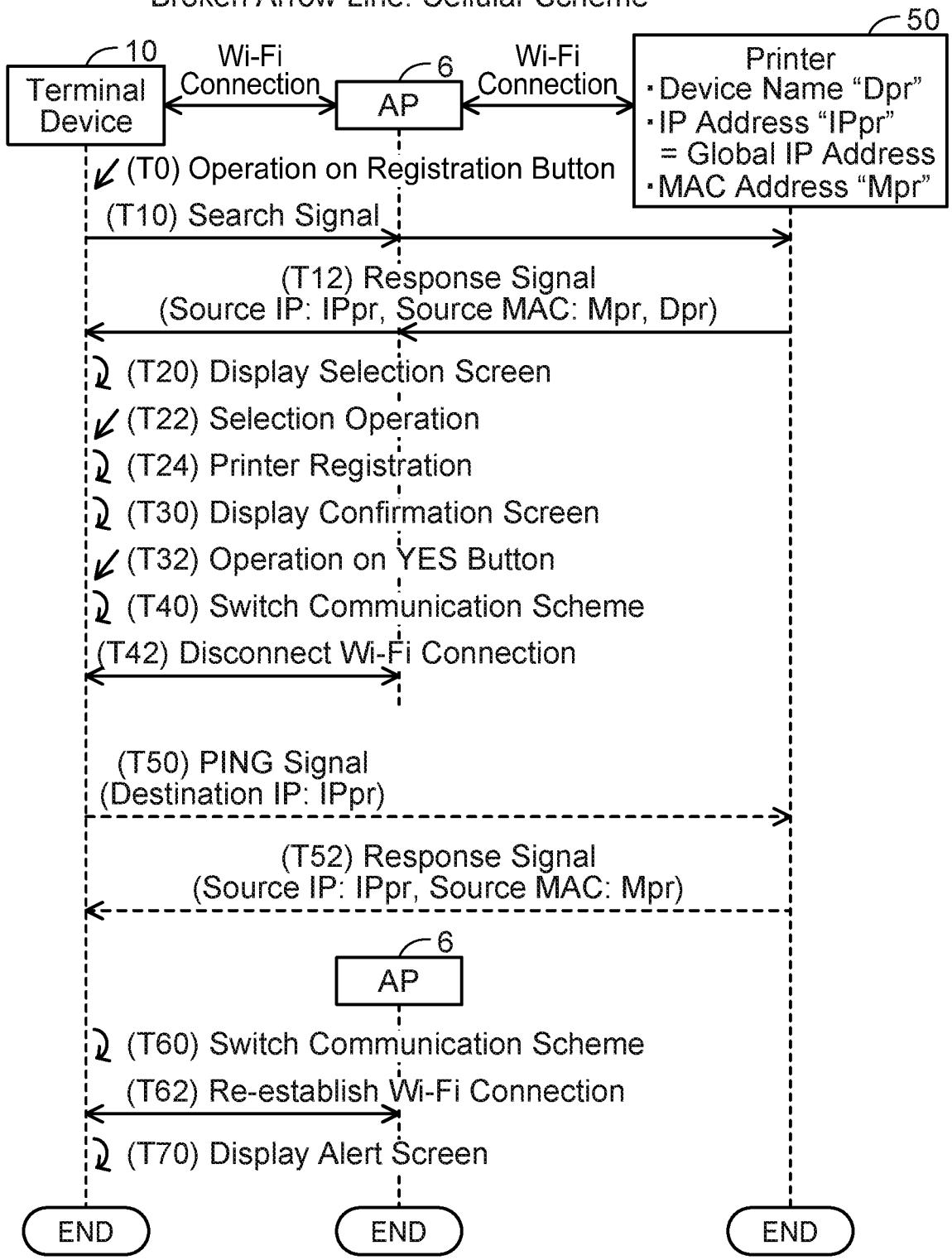
FIG. 4 shows a sequence diagram of a first embodiment.

(Specific Case; FIG. 4)

Next, a specific case realized by the processes of FIG. 2 and FIG. 3 will be described with reference to FIG. 4. In the present case, the printer 50 is assigned with the IP address "IPpr", which is a global IP address. Moreover, the firewall function of the AP 6 is disabled. In FIG. 4, solid arrow lines indicate Wi-Fi communication, and broken arrow lines indicate cellular communication.

In a case where the operation of selecting the registration button 202 in the home screen 200 is accepted in T0 (the trigger of the process of FIG. 2), the terminal device 10 sends a search signal to the printer 50 via the AP 6 in T10 (S10) and receives a response signal from the printer 50 via the AP 6 in T12 (S12). The response signal includes the device name "Dpr", the IP address "IPpr", and the MAC address "Mpr" of the printer 50.

The terminal device 10 displays the selection screen 220 including the device name "Dpr" in T20 (S20) and accepts the operation of selecting the device name "Dpr" in T22 (YES in S22). In this case, in T24, the terminal device 10 registers the information of the printer 50 (S30).

The terminal device 10 determines that the IP address "IPpr" is the global IP address (YES in S50 of FIG. 3) and displays the confirmation screen 240 in T30 (S52). In a case where the operation of selecting the YES button in the confirmation screen 240 is accepted in T32 (YES in S54), the terminal device 10 switches the communication scheme from the Wi-Fi scheme to the cellular scheme in T40 (S60). As a result, in T42, the Wi-Fi connection between the terminal device 10 and the AP 6 is disconnected.

In T50, the terminal device 10 sends, by using the cellular communication, a PING signal including the IP address "IPpr" as its destination IP address (S62). Since the firewall function of the AP 6 is disabled in the present case, the PING signal is received by the printer 50. For this reason, the terminal device 10 receives in T52, from the printer 50, a response signal that includes the IP address "IPpr" as its source IP address and further includes the MAC address "Mpr" as its source MAC address (YES in S64).

In T60, the terminal device 10 switches the communication scheme from the cellular scheme to the Wi-Fi scheme (S70). As a result, in T62, a Wi-Fi connection between the terminal device 10 and the AP 6 is re-established. Then, the terminal device 10 determines that the source MAC address "Mpr" included in the response signal matches the MAC address "Mpr" registered in T24 (YES in S80) and displays the alert screen in T70. Thereby, the user can be informed that the printer 50 may be accessed in an unauthorized manner via the Internet 8. Due to this, the user can change the IP address of the printer 50 from the global IP address to a private IP address and/or can enable the firewall function of the AP 6, for example. Moreover, the user can change a communication setting of the printer 50 (e.g., disable a communication port) to realize a state where an unauthorized access to the printer 50 does not occur, for example.

Effects of Present Embodiment

According to the present embodiment, after receiving the IP address "IPpr", which is a global IP address, from the printer 50 by using the Wi-Fi scheme (i.e., after T12), the terminal device 10 sends the PING signal including the IP address "IPpr" as the destination IP address via the Internet 8 by using the cellular scheme (T50). Then, the terminal device 10 determines whether the response signal including the IP address "IPpr" as the source IP address has been received. Thereby, the terminal device 10 can determine whether there is the possibility of the printer 50 being accessed in an unauthorized manner via the Internet 8. Therefore, the printer 50 does not have to be provided with a mechanism for executing the determination. Due to this, the configuration of the printer 50 can be simplified. In a case of determining that the response signal including the IP address "IPpr" as the source IP address has been received, that is, in the case of determining that there is the possibility of the printer 50 being accessed in an unauthorized manner via the Internet 8, the terminal device 10 displays the alert screen (T70). Thereby, it is possible to prevent the printer 50 from being accessed in an unauthorized manner via the Internet 8.

Correspondence Relationships

The terminal device 10 and the printer 50 are examples of "communication device" and "target device", respectively. The IP address "IPpr" and the MAC address "Mpr" are examples of "target IP address" and "target identification information", respectively. The Wi-Fi scheme and the cellular scheme are examples of "first communication scheme" and "second communication scheme", respectively. The PING signal of T50 and the response signal of T52 in FIG. 4 are examples of "first signal" and "second signal", respectively. The process of S82 in FIG. 3 is an example of "security process". The operation of selecting the device name "Dpr" in S22 of FIG. 2 is an example of "the instruction being for registering information related to the target device in the communication device".

The process of S12 in FIG. 2, the process of S50, the process of S60, the process of S62, the process of S64 (and S66), the process of S70, the process of S80, and the process of S82 in FIG. 3 are examples of "receive a target IP address", "determine whether the target IP address is the global IP address", "disconnect the connection", "send a first signal", "determine whether a second signal is received", "re-establish the connection", "determine whether source identification information included in the second signal matches the target identification information", and "execute a security process" respectively.

Second Embodiment

Next, a second embodiment will be described. In the first embodiment, it is premised that the terminal device 10 is capable of using the cellular scheme. By contrast, in the present embodiment, the terminal device 10 may be incapable of using the cellular scheme. For example, in a case where the terminal device 10 is not provided with the cellular I/F 18, the terminal device 10 is incapable of using the cellular scheme. Moreover, the terminal device 10 is incapable of using the cellular scheme even provided with the cellular I/F 18, for example, in a case where the user does not subscribe to a business entity providing cellular communication, that is, in a case where the cellular I/F 18 is disabled. In the present embodiment, in the case where the terminal device 10 is incapable of using the cellular scheme, the terminal device 10 uses a server 100 (see FIG. 1) connected to the Internet 8 to determine whether there is the possibility of the printer 50 being accessed in an unauthorized manner via the Internet 8.

(Configuration of Server 100; FIG. 1)

As shown in FIG. 1, in the present embodiment, the communication system 2 further comprises the server 100 configured to confirm whether the printer 50 can be accessed via the Internet 8. The server 100 is provided on the Internet 8 by the vendor of the printer 50.

The server 100 comprises a communication I/F 112 and a controller 120. The communication I/F 112 is connected to the Internet 8. The controller 120 comprises a CPU 122 and a memory 124. The memory 124 is constituted of a volatile memory, a non-volatile memory, and the like. The CPU 122 is configured to execute various processes in accordance with a program 126 stored in the memory 124.

(Security Determination Process; FIG. 3)

Contents of a security determination process of the present embodiment will be described with reference to FIG. 3. In a case where the operation of selecting the YES button in the confirmation screen is accepted (YES in S54), the CPU 22 determines in S100 whether the terminal device 10 is capable of using the cellular scheme.

In the case where the terminal device 10 is not provided with the cellular I/F 18, or in the case where the cellular I/F 18 is disabled, the CPU 22 determines that the terminal device 10 is incapable of using the cellular scheme (NO in S100), and executes a server request process (see FIG. 5) in S110. When S110 completes, the process of FIG. 3 ends. In a variant, in the case of NO in S100, the CPU 22 may end the process of FIG. 3 without executing S110.

In the case where the terminal device 10 is provided with the cellular I/F 18 and the cellular I/F 18 is enabled, the CPU 22 determines that the terminal device 10 is capable of using the cellular scheme (YES in S100) and proceeds to S60. In this case, as in the first embodiment, whether there is the possibility of an unauthorized access to the printer 50 is determined by using the cellular communication.

Figure 5:
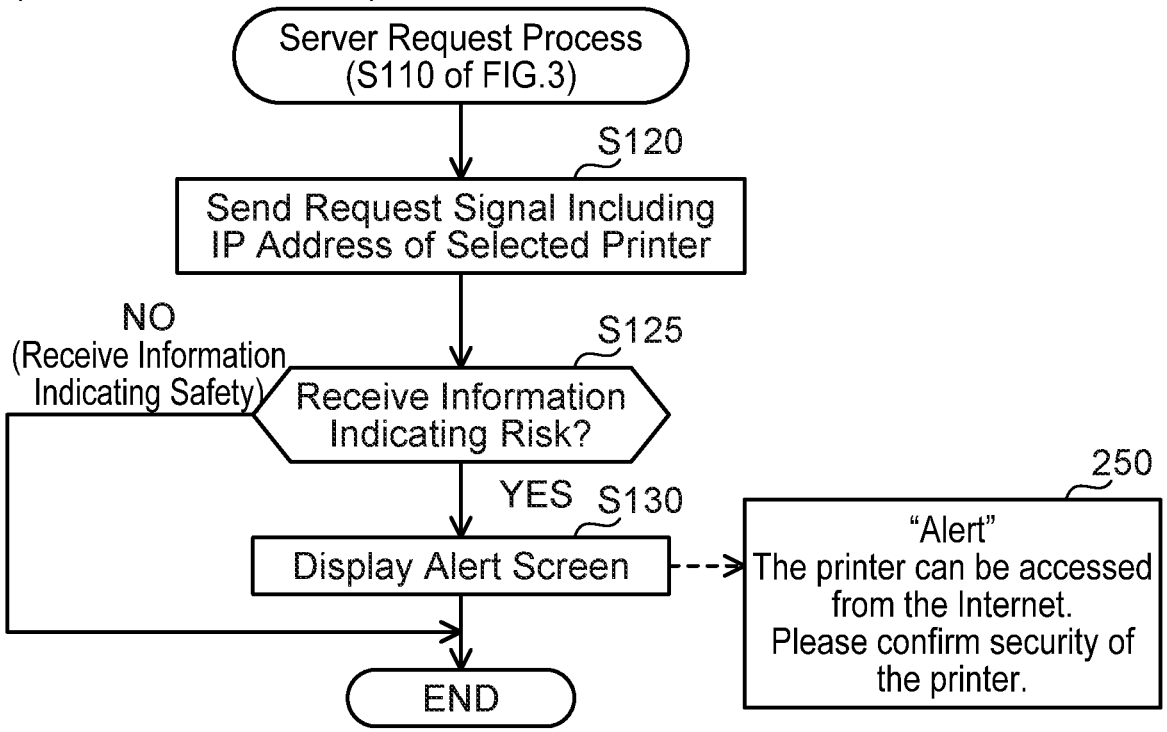
FIG. 5 shows a flowchart of a server request process of a second embodiment.

(Server Request Process; FIG. 5)

Next, contents of the server request process of S110 in FIG. 3 will be described with reference to FIG. 5. In S120, the CPU 22 sends a request signal including the IP address "IPpr" and the MAC address "Mpr" of the printer 50 to the server 100 via the Internet 8 by using the Wi-Fi I/F 16. The request signal is a signal for causing the server 100 to send a PING signal including the IP address "IPpr" as its destination IP address via the Internet 8 without receiving a signal from the printer 50.

In S125, the CPU 22 determines whether information indicating risk has been received from the server 100 via the Internet 8 by using the Wi-Fi I/F 16. In a case of determining that the information indicating risk has been received from the server 100 (YES in S125), the CPU 22 displays an alert screen on the display unit 14 in S130. This alert screen is the same as the alert screen of S82 in FIG. 3. On the other hand, in a case of determining that information indicating safety has been received from the server 100 (NO in S125), the CPU 22 skips S130 and ends the process of FIG. 5.

Figure 6:
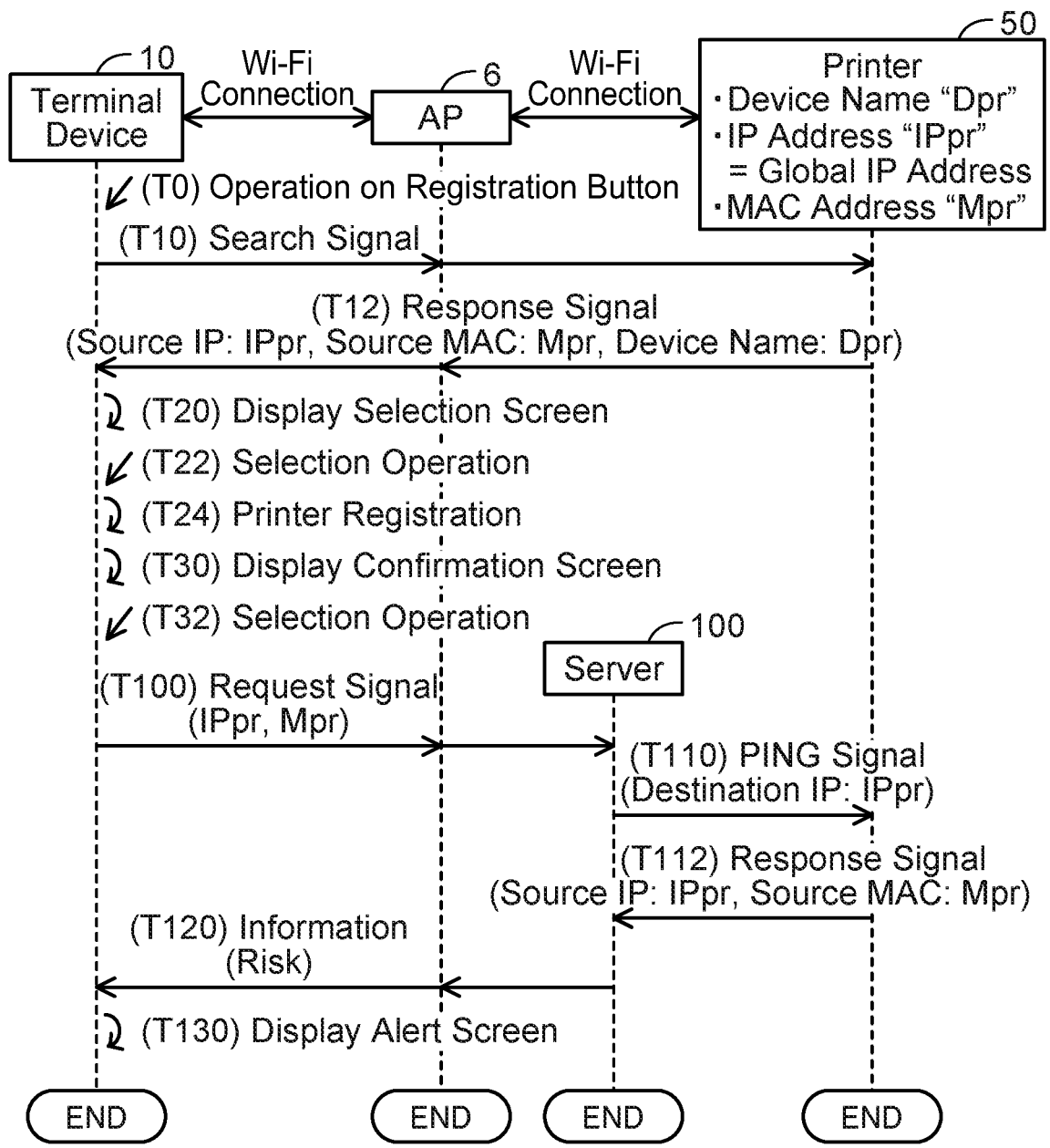
FIG. 6 shows a sequence diagram of the second embodiment.

(Specific Case; FIG. 6)

Next, a specific case realized by the present embodiment will be described with reference to FIG. 6. In the present case, the terminal device 10 is incapable of using the cellular scheme. Moreover, a state of the printer 50 is the same as the state of the printer 50 of FIG. 4.

T0 to T32 are the same as those of FIG. 4. In a case where the operation of selecting the YES button in the confirmation screen is accepted in T32 (YES in S54 of FIG. 3), the terminal device 10 determines that the terminal device 10 is incapable of using the cellular scheme (NO in S100) and sends a request signal including the IP address "IPpr" and the MAC address "Mpr" to the server 100 via the AP 6 and the Internet 8 (S120 of FIG. 5).

In a case of receiving the request signal from the terminal device 10 in T100, the server 100 sends a PING signal including the IP address "IPpr" as its destination IP address to the printer 50 in T110. In T112, the server 100 receives, from the printer 50, a response signal that includes the IP address "IPpr" as its source IP address and further includes the MAC address "Mpr" as its source MAC address. Here, the reception of the response signal means that there is the possibility of the printer 50 being accessed in an unauthorized manner via the Internet 8.

The server 100 determines whether the source MAC address included in the response signal matches the MAC address included in the request signal of T100. In the present case, the server 100 determines that the source MAC address "Mpr" matches the MAC address "Mpr" included in the request signal and sends the information indicating risk to the terminal device 10 in T120. In a case where the server 100 does not receive the response signal of T112 or in a case where the source MAC address included in the response signal does not match the MAC address "Mpr" included in the request signal, the server 100 sends the information indicating safety to the terminal device 10.

In a case of receiving the information indicating risk from the server 100 via the Internet 8 and the AP 6 in T120 (YES in S125), the terminal device 10 displays the alert screen (S130). Thereby, the user can be informed that the printer 50 may be accessed in an unauthorized manner via the Internet 8.

Effect of Present Embodiment

According to the present embodiment, in the case where the terminal device 10 is incapable of using the cellular scheme, it is possible to determine, by using the server 100, whether there is the possibility of an unauthorized access to the printer 50 via the Internet 8. In the present embodiment as well, the mechanism for executing the determination does not have to be provided in the printer 50.

Correspondence Relationships

The request signal of T100, the PING signal of T110, and the response signal of T112 are examples of "request signal", "specific signal", and "response signal", respectively. The information indicating risk is an example of "specific information". The process of S100 in FIG. 3, the process of S120 and the process of S125 in FIG. 5 are examples of "determining whether the communication device is capable of using the second communication scheme", "sending a request signal", and "determining whether specific information is received", respectively.

(Variant 1) The communication system 2 may comprise, instead of the terminal device 10, a service providing server (called "SP server" below) that is configured to execute provision of a service (e.g., an automatic order service for consumable articles) to the printer 50. In this case, for example, when an XMPP (abbreviation of eXtensible Messaging and Presence Protocol) connection (i.e., a so-called constant connection) is established between the SP server and the printer 50 via the Internet 8, the SP server uses the XMPP connection (i.e., uses a communication scheme in accordance with XMPP) to send, to the printer 50 via the Internet 8, a GET request for requesting sending of the IP address of the printer 50, and receives a GET response including the IP address "IPpr" from the printer 50 via the Internet 8. In this case, the SP server sends an HTTP request including the IP address "IPpr" as its destination IP address via the Internet 8 by using a communication scheme in accordance with HTTP (an example of Hyper Text Transfer Protocol) without using the XMPP connection. In a case of receiving an HTTP response including the IP address "IPpr" as its source IP address from the printer 50 via the Internet 8, the SP server determines that there is the possibility of the printer 50 being accessed in an unauthorized manner via the Internet 8. In this case, the SP server sends a command instructing display of the alert screen to the printer 50 by using the XMPP connection, for example. In the present variant, the SP server is an example of "communication device". The communication scheme in accordance with XMPP and the communication scheme in accordance with HTTP are examples of "first communication scheme" and "second communication scheme", respectively. The HTTP request and the HTTP response are examples of "first signal" and "second signal", respectively. Moreover, as in the present variant, "receive a target IP address" may include receiving a target IP address from a target device via the Internet.

(Variant 2) In S82 of FIG. 3, instead of displaying the alert screen, the terminal device 10 may send a command instructing display of the alert screen to the printer 50. In another variant, the terminal device 10 may send to the printer 50 an email indicating that there is the possibility of an unauthorized access to the printer 50, with a mail address of an administrator of the printer 50 as its destination. Moreover, in another variant, the terminal device 10 may send, to the printer 50, an instruction for disabling a communication port for receiving signals from the Internet 8. All the variants are examples of "security process".

(Variant 3) The terminal device 10 may establish a Wi-Fi connection with the printer 50, without intermediation of the AP 6, in accordance with WFD (abbreviation of Wi-Fi Direct) or Soft AP. That is, in the first and second embodiments described above, the Wi-Fi connection established between the terminal device 10 and the printer 50 via the AP 6 is an example of "connection established between the communication device and the target device (described simply as "connection" below)", however, in the present variant, the Wi-Fi connection established directly between the terminal device 10 and the printer 50 is an example of "connection".

(Variant 4) The terminal device 10 may be capable of simultaneously establishing a Wi-Fi connection and a cellular connection. In this case, the terminal device 10 may not execute S60 and S70 of FIG. 3. In the present variant, "disconnect the connection" and "re-establish the connection" may be omitted. Moreover, the Wi-Fi I/F 16 and the cellular I/F 18 may not be configured separately, and may be configured integrally (i.e., may be implemented by one chip).

(Variant 5) "First communication scheme" is not limited to the Wi-Fi scheme, and may be a BlueTooth (registered trademark) scheme, an NFC scheme, a TransferJet (registered trademark) scheme, etc. In the present variant, a connection of BlueTooth or the like established directly between the terminal device 10 and the printer 50 is an example of "connection".

(Variant 6) The printer 50 may not establish a Wi-Fi connection with the AP 6. The terminal device 10 executes communication in accordance with the BlueTooth scheme and receives the IP address "IPr" from the printer 50. Then, the terminal device 10 may send a signal including the IP address "IPr" as its destination IP address to the Internet 8 via the AP 6 by using Wi-Fi communication. In the present variant, the Wi-Fi scheme is an example of "second communication scheme".

(Variant 7) The processes from S52 onward in FIG. 3 may be always executed without executing S50. In the present variant, "determine whether the target IP address is the global IP address" may be omitted.

(Variant 8) S80 of FIG. 3 may not be executed. In the present variant, "receive target identification information" and "determine whether source identification information included in the second signal matches the target identification information" may be omitted.

(Variant 9) A timing when the security determination process of S40 in FIG. 2 (i.e., the process of FIG. 3) is executed is not limited to the timing when the information of the printer 50 is registered in the terminal device 10. For example, the security determination process may be executed at a timing when a predetermined operation is performed by the user after the information of the printer 50 has been registered. Moreover, for example, the app 28 may include a program for connecting the printer 50 to the AP 6, and in this case, the security determination process may be executed at a timing when the printer 50 is connected to the AP 6. The program may be a program for connecting to the AP 6 in accordance with a DPP (abbreviation of Device Provisioning Protocol) scheme to be formulated by the Wi-Fi Alliance. The DPP scheme is described in "DRAFT Device Provisioning Protocol Technical Specification Version 0.2.11", which is a draft of a standard prepared by the Wi-Fi Alliance.

(Variant 10) "Target identification information (or source identification information)" is not limited to the MAC address, and may be another type of identification information such as a device name, a serial number, etc.

(Variant 11) "Target device" is not limited to the printer 50, and includes various devices such as a scanner, a copy machine, a multi-functional device, a server, a PC, a smartphone, etc.

(Variant 12) "Communication device" is not limited to the terminal device 10, and may be a scanner, a printer, etc.

(Variant 13) In each of the above embodiments, the respective processes executed by the terminal device 10 are executed by software (i.e., the app 28). Instead of this, one or more of the processes may be implemented by hardware such as a logic circuit.

What is claimed is:

1. A non-transitory computer-readable medium storing computer-readable instructions for a communication device, the computer-readable instructions, when executed by a processor of the communication device, causing the communication device to:

receive a target IP address from a target device by using a first communication scheme, the target IP address being an IP address of the target device, and the target device being different from the communication device;

after the target IP address which is a global IP address has been received from the target device, send a first signal including the target IP address as a destination IP address via the Internet by using a second communication scheme different from the first communication scheme;

determine whether a second signal is received via the Internet by using the second communication scheme in response to sending the first signal, the second signal including the target IP address as a source IP address; and in a case where it is determined that the second signal is received, execute a security process related to security of the target device, wherein in a case where it is determined that the second signal is not received, the security process is not executed.

2. The non-transitory computer-readable medium as in claim 1, wherein
the target IP address is received from the target device by using the first communication scheme not via the Internet.

3. The non-transitory computer-readable medium as in claim 1, wherein
the target IP address is received from the target device by using a connection according to the first communication scheme, the connection being established between the communication device and the target device, and
the computer-readable instructions, when executed by the processor, further cause the communication device to:
after the target IP address has been received from the target device, disconnect the connection,
wherein after the connection has been disconnected, the first signal is sent.

4. The non-transitory computer-readable medium as in claim 3, wherein
the computer-readable instructions, when executed by the processor, further cause the communication device to:
after it has been determined whether the second signal is received, re-establish the connection.

5. The non-transitory computer-readable medium as in claim 1, wherein
the computer-readable instructions, when executed by the processor, further cause the communication device to:
receive target identification information for identifying the target device from the target device by using the first communication scheme; and
in the case where it is determined that the second signal is received, determine whether source identification information included in the second signal matches the target identification information, wherein in a case where it is determined that the second signal is received and it is determined that the source identification information matches the target identification information, the security process is executed, and in a case where it is determined that the second signal is received and it is determined that the source identification information does not match the target identification information, the security process is not executed.

6. The non-transitory computer-readable medium as in claim 1, wherein it is determined that the second signal is received in a case where the second signal is received by a timing at which a predetermined time elapses since the first signal was sent, and it is determined that the second signal is not received in a case where the second signal is not received by the timing at which the predetermined time elapses since the first signal was sent.

7. The non-transitory computer-readable medium as in claim 1, wherein the computer-readable instructions, when executed by the processor, further cause the communication device to:

after the target IP address has been received from the target device, determine whether the target IP address is the global IP address, wherein in a case where it is determined that the target IP address is the global IP address, the first signal is sent, and in a case where it is determined that the target IP address is not the global IP address, the first signal is not sent.

8. The non-transitory computer-readable medium as in claim 1, wherein the first communication scheme is a scheme according to IEEE 802.11, and the second communication scheme is a cellular scheme.

9. The non-transitory computer-readable medium as in claim 1, wherein the computer-readable instructions, when executed by the processor, further cause the communication device to:

determine whether the communication device is capable of using the second communication scheme, wherein in a case where the target IP address which is the global IP address is received from the target device and it is determined that the communication device is capable of using the second communication scheme, the first signal is sent, and in a case where the target IP address which is the global IP address is received from the target device and it is determined that the communication device is incapable of using the second communication scheme, the first signal is not sent.

10. The non-transitory computer-readable medium as in claim 1, wherein the computer-readable instructions, when executed by the processor, further cause the communication device to:

in a case where the target IP address which is the global IP address is received from the target device and it is determined that the communication device is incapable of using the second communication scheme, send a request signal including the target IP address to a server via the Internet, the request signal being for causing the server to send a specific signal via the Internet without receiving a signal from the target device, the specific signal including the target IP address as a destination IP address; and after the request signal has been sent to the server, determine whether specific information is received from the server via the Internet, wherein the specific information is received from the server in a case where the server receives a response signal including the target IP address as a source IP address in response to the server having sent the specific signal, and the specific information is not received from the server in a case where the server does not receive the response signal in response to the server having sent the specific signal, wherein in a case where it is determined that the specific information is received from the server, the security process is executed, and in a case where it is determined that the specific information is not received from the server, the security process is not executed.

11. The non-transitory computer-readable medium as in claim 1, wherein the first signal is sent after the target IP address which is the global IP address has been received from the target device and an instruction has been provided from a user, the instruction being for registering information related to the target device in the communication device.

12. A communication device comprising:

a processor; and a memory storing computer-readable instructions therein, the computer-readable instructions, when executed by the processor, causing the communication device to:

receive a target IP address from a target device by using a first communication scheme, the target IP address being an IP address of the target device, and the target device being different from the communication device;

after the target IP address which is a global IP address has been received from the target device, send a first signal including the target IP address as a destination IP address via the Internet by using a second communication scheme different from the first communication scheme;

determine whether a second signal is received via the Internet by using the second communication scheme in response to sending the first signal, the second signal including the target IP address as a source IP address; and in a case where it is determined that the second signal is received, execute a security process related to security of the target device, wherein in a case where it is determined that the second signal is not received, the security process is not executed.

13. The communication device as in claim 12, wherein the target IP address is received from the target device by using the first communication scheme not via the Internet.

14. The communication device as in claim 12, wherein the target IP address is received from the target device by using a connection according to the first communication scheme, the connection being established between the communication device and the target device, and the computer-readable instructions, when executed by the processor, further cause the communication device to:

after the target IP address has been received from the target device, disconnect the connection;

wherein after the connection has been disconnected, the first signal is sent.

15. The communication device as in claim 14, wherein the computer-readable instructions, when executed by the processor, further cause the communication device to:
after it has been determined whether the second signal is received, re-establish the connection.

16. The communication device as in claim 12, wherein the computer-readable instructions, when executed by the processor, further cause the communication device to:
receive target identification information for identifying the target device from the target device by using the first communication scheme; and
in the case where it is determined that the second signal is received, determine whether source identification information included in the second signal matches the target identification information,
wherein in a case where it is determined that the second signal is received and it is determined that the source identification information matches the target identification information, the security process is executed, and
in a case where it is determined that the second signal is received and it is determined that the source identification information does not match the target identification information, the security process is not executed.

17. The communication device as in claim 12, wherein
it is determined that the second signal is received in a case where the second signal is received by a timing at which a predetermined time elapses since the first signal was sent, and
it is determined that the second signal is not received in a case where the second signal is not received by the timing at which the predetermined time elapses since the first signal was sent.

18. The communication device as in claim 12, wherein the computer-readable instructions, when executed by the processor, further cause the communication device to:
after the target IP address has been received from the target device, determine whether the target IP address is the global IP address,
wherein in a case where it is determined that the target IP address is the global IP address, the first signal is sent, and
in a case where it is determined that the target IP address is not the global IP address, the first signal is not sent.

19. The communication device as in claim 12, wherein
the first communication scheme is a scheme according to IEEE 802.11, and
the second communication scheme is a cellular scheme.

20. The communication device as in claim 12, wherein the computer-readable instructions, when executed by the processor, further cause the communication device to:
determine whether the communication device is capable of using the second communication scheme,
wherein in a case where the target IP address which is the global IP address is received from the target device and it is determined that the communication device is capable of using the second communication scheme, the first signal is sent, and
in a case where the target IP address which is the global IP address is received from the target device and it is determined that the communication device is incapable of using the second communication scheme, the first signal is not sent.

21. A method executed by a communication device, the method comprising:
receiving a target IP address from a target device by using a first communication scheme, the target IP address being an IP address of the target device, and the target device being different from the communication device;
after the target IP address which is a global IP address has been received from the target device, sending a first signal including the target IP address as a destination IP address via the Internet by using a second communication scheme different from the first communication scheme;
determining whether a second signal is received via the Internet by using the second communication scheme in response to sending the first signal, the second signal including the target IP address as a source IP address; and
in a case where it is determined that the second signal is received, executing a security process related to security of the target device, wherein in a case where it is determined that the second signal is not received, the security process is not executed.

* * * * *